No. 647,332. Patented Apr. 10, 1900.
H. T. SHEARER.
LATHE ATTACHMENT.
(Application filed June 21, 1899.)
(No Model.) 3 Sheets—Sheet 1.
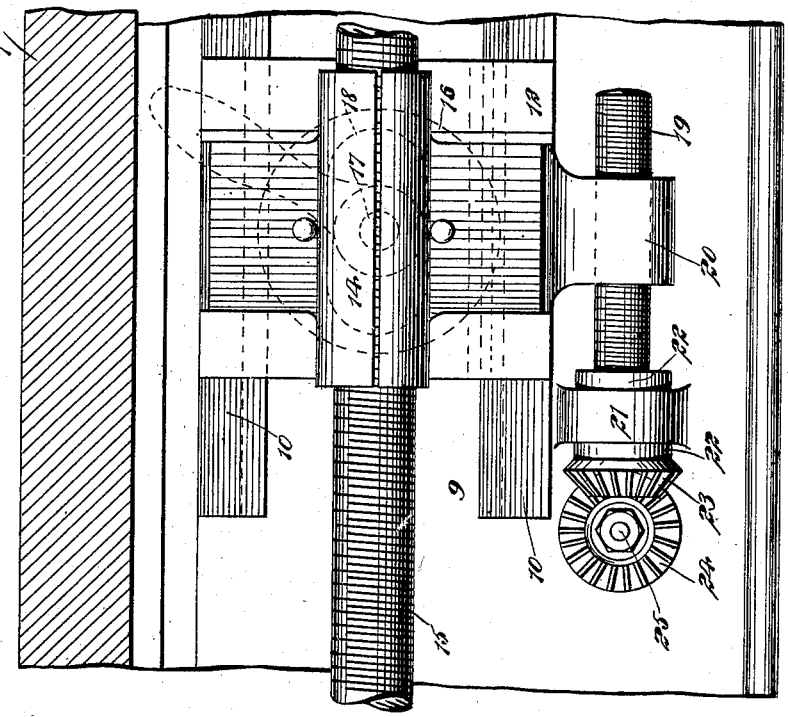

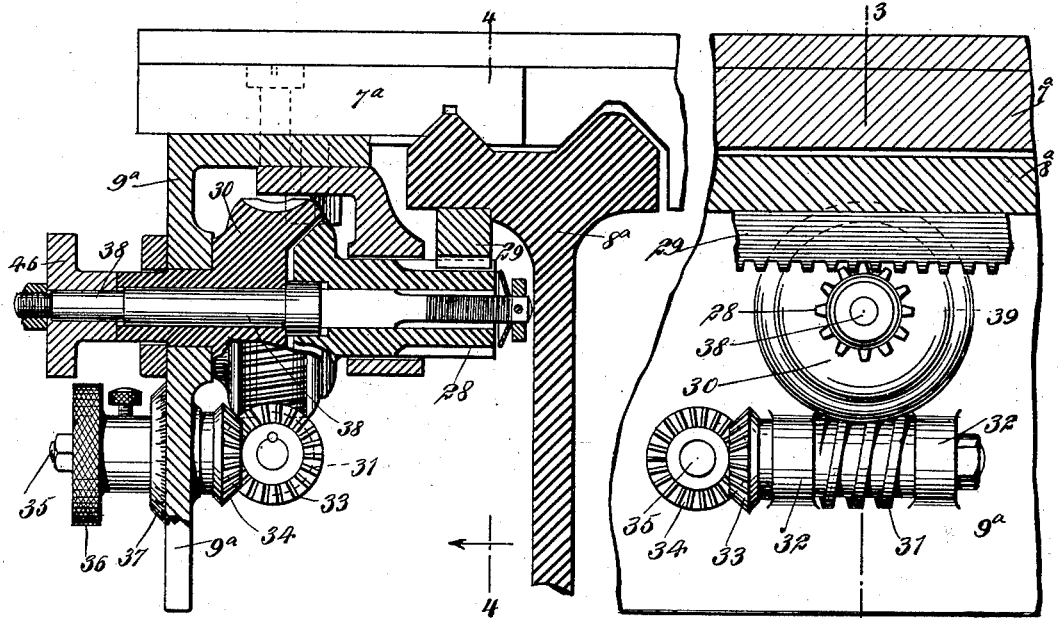

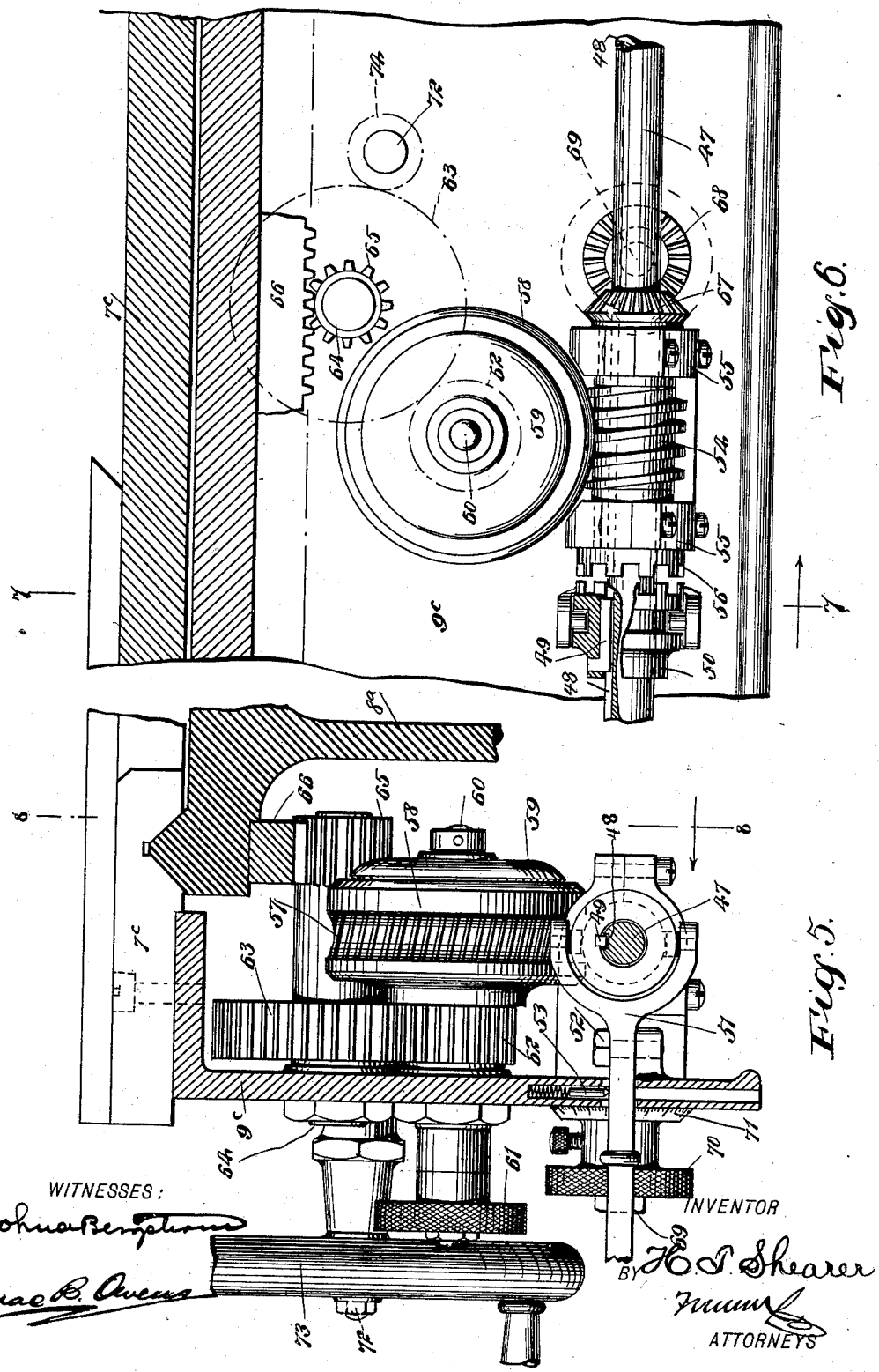

UNITED STATES PATENT OFFICE.

HARRY THOMPSON SHEARER, OF SCOTLAND, PENNSYLVANIA.

LATHE ATTACHMENT.

SPECIFICATION forming part of Letters Patent No. 647,332, dated April 10, 1900.

Application filed June 21, 1899. Serial No. 721,323. (No model.)

*To all whom it may concern:*

Be it known that I, HARRY THOMPSON SHEARER, of Scotland, in the county of Franklin and State of Pennsylvania, have invented a new and Improved Lathe Attachment, of which the following is a full, clear, and exact description.

The purpose of this invention is to provide means by which to permit the adjustment of the carriage on an engine-lathe independently of the driving mechanism thereof, thus permitting the tool to be accurately engaged with the work at all periods during the operation of the lathe.

This specification is the disclosure of several forms of my invention, while the claims define the actual scope thereof.

Reference is to be had to the accompanying drawings, forming a part of this specification, in which similar characters of reference indicate corresponding parts in all the views.

Figure 1 is an elevational view of my invention with part of the lathe in section. Fig. 2 is a sectional view on the line 2 2 of Fig. 1. Fig. 3 is a sectional view of a modification on the line 3 3 of Fig. 4. Fig. 4 is a sectional view on the line 4 4 of Fig. 3. Fig. 5 is a sectional view of a further modification, the section being on the line 7 7 of Fig. 8; and Fig. 6 is a section on line 8 8 of Fig. 7.

Referring to Figs. 1 and 2, the invention is applied to a lathe having a carriage 7 running on a track 8 and carrying an apron 9. The apron 9 is formed with a slideway 10 on its inner face, in which the dovetail 11 of the frame 12 slides. The frame 12 carries the usual nut 14 for the feed-screw 15, and the frame 12 also carries the nut-operating device 16, the spindle 17 of which projects through a horizontal slot 18, formed in the apron 9, by means of which slot the frame 12, with the attached parts, including the spindle 17, may move horizontally independently of the apron.

Now for the purpose of adjusting the carriage, with its apron, independently of the frame 12 I provide a screw 19, which works in a nut 20, fast to the frame 12, and which is held to turn, but not to slide, on the apron 9 by means of a lug 21, rigid with the apron, through which lug the screw passes, the screw having collars 22 passed through and respectively engaging the sides of the lug. To one end of the screw 19 is fastened a miter-gear 23, which meshes with a similar gear 24, fast on the spindle 25, revolubly mounted in the apron 9 and projected through and beyond the same. The outer end of this spindle 25 is provided with a thumb-wheel 26 and a micrometer-gage 27, the gage reading against a suitable mark on the apron. With this arrangement, should it become necessary during the operation of the lathe—for example, in cutting a screw—to remove the tool temporarily from the lathe, when the tool is replaced it may be easily adjusted properly to the work without the usual disadvantages by throwing the spindle 17 to lock the nut 14 with the feed-screw 15 and then turning the spindle 25, so that through the action of the screw 19 on the nut 20 the carriage and apron will be moved, such parts moving independently of the frame 12 and screw 15, which operation is made possible by the formation of the slot 18 in the apron. It may be observed that by means of this structure the adjustment referred to may be effected notwithstanding the action of the screw 15, which, whether turning or stationary, does not interfere with the action of the parts 25, 19, and 20. It is only essential that the frame 12 have connection with the screw 15.

In Figs. 3 and 4 the same arrangement is applied to a lathe in which the carriage 7ª and apron 9ª are driven on the track 8ª by means of the well-known clutch and pinion, (not shown,) the pinion meshing with a rack 29, fixed to the track 8ª. For adjusting the carriage I provide a clutch 30, which is of a construction similar to that usually employed in lathes driven by the rack and pinion referred to. This clutch 30 drives a pinion 28, which meshes with the rack 29, the spindle 38 of the clutch being passed through the apron 9ª and provided with a hand-wheel 46, permitting the clutch to be thrown into and out of gear. One member of the clutch 30 is formed with the well-known worm-teeth thereon, and these teeth are meshed with a worm 31, which is mounted to turn in lugs 32, attached to the apron 9ª. One of the journals of the worm 31 has a bevel-gear 33 fast thereto, which meshes with a similar gear 34, attached to a spindle 35, mounted to turn in the apron 9ª.

This spindle has a hand-wheel 36 for permitting the spindle to be turned. A micrometer-scale 37 is also provided, by which to determine exactly the adjustment effected. When the clutch 30 is out of gear, the pinion 28 runs freely on the rack 29 without transmitting movement to the clutch 30; but when the clutch is thrown into gear the carriage and its attached parts may be advanced independently of the driving-gear above referred to by means of the gears 33 and 34 and the connected parts. When the spindle 35 is turned to turn the gear 34, this gear drives the worm 31 and the worm transmits its movement to the clutch 30, thus turning the pinion 28 and moving the carriage in the desired direction. It should be distinctly understood that the devices shown in Figs. 3 and 4 are independent of the usual driving-gear, which is applied in the manner well understood.

In Figs. 5 and 6 I have illustrated means for adjusting the carriage, which means are directly associated with the driving devices, the invention being applied to the before-mentioned rack-and-pinion lathe. In these views the carriage 7ᶜ, running, as usual, on the track 8ᵃ and carrying the apron 9ᶜ, is driven from a shaft 47, which is mounted to turn beneath the table. This shaft has a keyway 48 cut therein and in which keyway loosely fits the key 49 of a clutch member 50, which member is thereby splined on the shaft 47. The clutch member 50 has an annular groove formed therein, which loosely receives pins attached to the arms of a forked lever 51 for throwing the clutch member 50 longitudinally on the shaft 47. The lever 51 is fulcrumed on a pin 52, attached to the apron 9ᶜ, the lever extending through the apron and having a handle portion, as shown, so that the operator may shift the lever as desired. The lever is held at the adjustment to which it is thrown by means of a spring-pressed pin 53.

A worm 54 has journals formed on its ends, and these journals are loosely mounted in bearings 55, attached to the apron 9ᶜ. One of the journals 55 adjacent to the clutch member 50 has a clutch member 56 formed thereon, and this clutch member is arranged to coact with the member 50, so that when the two are engaged the worm 54 will be driven from the shaft 47. The worm 54 meshes with worm-teeth 57, formed on a clutch member 58. This clutch member 58 works with a similar member 59, both being carried on a spindle 60, which projects through the apron 9ᶜ and has a hand-wheel 61, permitting the operation of the spindle. The parts 57, 58, 59, 60, and 61 are similar to the usual clutch devices of the well-known rack-and-pinion lathe-driving mechanism. Therefore by operating the hand-wheel 61 the clutch members 58 and 59 may be engaged and disengaged, and the member 59 being fast to the spindle 60 when the clutch members are engaged the spindle will be driven from the worm 54. The spindle 60 carries a pinion 62, meshing with a spur-gear 63, mounted on a stub-shaft 64. Connected to turn with the gear 63 and carried on the shaft 64 is a pinion 65, which meshes with a rack 66, attached to the track 8ᵃ. It will therefore be seen that when the clutch members 56 and 50 are engaged the worm 54 will be driven from the shaft 47 and also that when the clutch members 58 and 59 are engaged the worm 54 will transmit its movement to the pinion 65, thus driving the carriage.

Now for effecting an independent adjustment of the carriage I fasten to the journal of the worm 54, which journal is opposite the clutch member 56, a bevel-gear 67, which meshes with a similar gear 68, carried on a shaft 69, mounted in the apron 9ᵃ. This shaft has a hand or thumb wheel 70, and the shaft works with a micrometer-scale 71 to indicate the adjustment effected. To adjust the carriage independently of the machine driving-gear—that is to say, of the shaft 47—the clutch members 50 and 56 should be disengaged and the clutch members 58 and 59 engaged. Then by turning the spindle 69 the worm 54 may be driven, and this worm transmitting its movement through the parts 58, 59, 60, 62, 63, and 65 will adjust the carriage as desired. I also provide a hand feeding mechanism for driving the carriage manually without employing either clutch for the transmission of movement. This arrangement consists in a shaft or spindle 72, mounted in the apron 9ᶜ and carrying at its outer end a hand-wheel 73 and at its inner end a pinion 74. This pinion 74 meshes with the spur-gear 63, and by turning the hand-wheel 73 the gear 63 may be driven, thus driving the pinion 65 and advancing the carriage.

Having thus described my invention, I claim as new and desire to secure by Letters Patent—

1. In a lathe, the combination of a carriage, an apron attached thereto, a frame mounted to move on the apron, means for driving the carriage, such means working through the medium of the frame, a screw mounted to turn on the apron and engaging a part of the frame, and means mounted on the apron, for turning the screw whereby to move the apron and carriage relatively to the frame.

2. In a lathe, the combination of a carriage and its apron, the latter having a slideway and a slot adjacent to each other, a frame mounted to move in the slideway, a driving-gear, a nut mounted on the frame, means for operating the nut, such means comprising a spindle moving through the slot in the apron, and means working between the frame and the apron, for moving the apron and carriage relatively to the frame.

3. In a lathe, the combination with the track thereof, of a carriage and apron mounted to move on the track, a frame supported on the apron and movable relatively thereto, driving-gear for the apron, such gear working with the frame, and means working between the carriage and frame for relatively adjusting such parts independently of the driving-gear.

4. In a lathe, the combination with the track thereof, of a carriage and apron mounted to move on the track, a driving-gear working with the apron to advance the apron and carriage, and means mounted on the apron for adjusting the apron and carriage longitudinally of the track and relatively to the driving-gear either simultaneously or non-simultaneously with the operation thereof.

HARRY THOMPSON SHEARER.

Witnesses:
JOHN J. COFFMAN,
W. RUSH GILLAN.